(12) United States Patent
Kawamoto et al.

(10) Patent No.: US 7,511,391 B2
(45) Date of Patent: Mar. 31, 2009

(54) ELECTROMAGNETIC ACTUATOR

(75) Inventors: Hisashi Kawamoto, Chiba (JP); Satoru Tada, Chiba (JP); Takashi Nakano, Chiba (JP)

(73) Assignee: Seiko Precision Inc., Chiba (JP)

( * ) Notice: Subject to any disclaimer, the term of this patent is extended or adjusted under 35 U.S.C. 154(b) by 0 days.

(21) Appl. No.: 11/364,597

(22) Filed: Feb. 27, 2006

(65) Prior Publication Data

US 2006/0145798 A1    Jul. 6, 2006

Related U.S. Application Data

(63) Continuation of application No. PCT/JP2004/012295, filed on Aug. 26, 2004.

(30) Foreign Application Priority Data

Aug. 29, 2003    (JP) ............... 2003-306821

(51) Int. Cl.
  *H02K 37/14*    (2006.01)
(52) U.S. Cl. .................. 310/49 R; 310/40 MM; 335/272
(58) Field of Classification Search ........... 310/36–39, 310/49 R, 254, 40 MM; 335/272
See application file for complete search history.

(56) References Cited

U.S. PATENT DOCUMENTS

| 4,361,790 A | | 11/1982 | Laesser et al. |
| 4,371,821 A | | 2/1983 | Laesser et al. |
| 4,691,132 A | * | 9/1987 | Bertram et al. ........ 310/156.15 |
| 5,381,064 A | * | 1/1995 | Bennet et al. ............. 310/49 R |
| 6,043,574 A | * | 3/2000 | Prudham ................... 310/49 R |
| 6,670,731 B2 | * | 12/2003 | Kotani et al. ............. 310/49 R |

FOREIGN PATENT DOCUMENTS

| CH | 625646 A5 | 7/1979 |
| JP | 53-42308 A | 4/1978 |
| JP | 61-85055 | 4/1986 |

OTHER PUBLICATIONS

International Search Report for PCT/JP2004/012295, dated Nov. 23, 2004.

* cited by examiner

*Primary Examiner*—Ramon M Barrera
(74) *Attorney, Agent, or Firm*—Michaud-Duffy Group LLP

(57) ABSTRACT

An electromagnetic actuator has a rotor and a stator around which coils are wound to face portions of an outer surface of the rotor. The stator is C-shaped, the rotor is arranged so that a rotation axis thereof is existent in a space surrounded by the stator, and both ends of the stator are respectively formed within a range from 15 to 90 degrees from a virtual base line with respect to the rotation axis serving as a center, when the virtual base line is set to run a center of the rotation axis and separate the stator into left and right.

11 Claims, 4 Drawing Sheets

ELECTROMAGNETIC ACTUATOR

CROSS-REFERENCE TO RELATED APPLICATIONS

This application is a continuation of and claims priority to International Patent Application No. PCT/JP2004/012295 filed on Aug. 26, 2004, which claims priority to Japanese Patent Application No. 2003-306821 filed on Aug. 29, 2003, the subject matter of these patent documents is incorporated by reference herein in its entirety.

BACKGROUND OF THE INVENTION

1. Field of the Invention

This invention generally relates to small-sized electromagnetic actuators for use in optical apparatuses such as cameras, and more particularly, to an electromagnetic actuator having a stator of the shape in which coils can be wound around efficiently in the manufacturing process and the capabilities of the electromagnetic actuator can be maintained.

2. Description of the Related Art

A shutter apparatus housed in an auto focus camera, for example, is driven by an electromagnetic actuator. In recent years, the sizes and weights of cameras have been decreased at a remarkable speed. This brings the need to provide small-sized and highly accurate electromagnetic actuators. Japanese Patent Application Publication No. 2-2382 (hereinafter, referred to as Document 1) discloses the electromagnetic actuator having two coils, which are provided around the stating element (stator) and are magnetically excited simultaneously to rotate the rotating element (rotor).

FIG. 4 is a plan view schematically showing the electromagnetic actuator 100 disclosed in Document 1. The stator 103 having a shape of isosceles trapezoid is arranged around the rotor 101. The stator 103 includes the three magnetic poles 104, 105, and 106. The first coil 108 and the second coil 109 are respectively provided on the left and on the right. The rotor 101 fabricated of a permanent magnet is made to rotate by controlling the directions of currents supplied to the coils 108 and 109 to change the directions of the magnetic fields. The third magnetic pole 106 is magnetically excited by the coils 108 and 109 provided on the left and on the right. The third magnetic pole 106 particularly has a protrusion portion 107 that gets closer to the rotor 101. The protrusion portion 107 causes North pole (or South pole) of the rotor 101 to be positioned to correspond to the protrusion portion 107, while there is no magnetic field (no current).

The electromagnetic actuator 100 disclosed in the above-mentioned Document 1 is configured in such a manner that the stator 103 surrounds almost the whole outer circumference of the rotor 101. Therefore, this actuator has a desirable structure in that the magnetic fluxes generated by the coils 108 and 109 hardly leak, and are therefore transmitted to the rotor 101 sufficiently enough to obtain an intensive turning force.

There is a drawback, however, in the production of the above-described electromagnetic actuator 100. As shown in FIG. 4, the stator 103 that is provided to surround the outer circumference of the rotor 101 has the coils 108 and 109 on the left and on the right thereof. In the practical manufacturing process, it is impossible to wind the coils around the stator having such a shape directly. Accordingly, in order to fabricate the above-described electromagnetic actuator 100, for instance, the stator 103 is detachably formed, and at the same time, the coils 108 and 109 are separately prepared. Then, another process is required to assemble them. In the manufacturing process of the above-described electromagnetic actuator 100, more parts are needed than those of the conventional actuators, resulting in the complicated assembling operation and increased man-hour.

As described heretofore, the electromagnetic actuator 100 is a desired one in view of the capabilities of an electromagnetic actuator. However, in view of manufacture, there is the problem that the number of parts is increased and the manufacturing process becomes complicated, thereby resulting in the increased manufacturing costs.

SUMMARY OF THE INVENTION

It is therefore an object of the present invention to provide an electromagnetic actuator having a structure where the capabilities thereof can be maintained and the efficiency can be promoted in the manufacturing process.

The afore-mentioned object can be achieved by an electromagnetic actuator comprising a rotor and a stator around which coils are wound to face portions of an outer surface of the rotor. The stator is C-shaped; the rotor is arranged so that a rotation axis thereof is existent in a space surrounded by the stator; and both ends of the stator are respectively formed within a range from 15 to 90 degrees from a virtual base line with respect to the rotation axis serving as a center, when the virtual base line is set to run a center of the rotation axis and separate the stator into left and right.

In accordance with the present invention, when the coil is wound around the stator with the use of a coil-winding apparatus in the manufacturing process, the ends of the stator, which can be obstacles, are arranged within a range from 15 to 90 degrees. It is therefore possible to wind the coil around the stator efficiently without a problem. It is also possible to set the ends of the stator to have a wider angle range, thereby enabling to retain the original capabilities of the electromagnetic actuator with the ends set to magnetic poles. Hence, in accordance with the present invention, it is possible to provide the electromagnetic actuator that can be manufactured efficiently, whereas the originally provided capabilities of the electromagnetic actuator are retained.

The afore-described angle range is set to a maximum range in which the ends of the stator are made to be obstacles, while the coil wire is being wound around the stator by use of the coil-winding apparatus. In addition, preferably, the stator includes shoulder portions that suppress misalignment or disintegration of the coils. With such a stator, the coil can be positioned on a given position when the coil is wound around the stator, and the wound coil can be retained stably on the given position.

As described above, in accordance with the present invention, it is possible to provide an electromagnetic actuator in which the fabrication efficiency can be promoted and originally provided capabilities of the electromagnetic actuator can be retained.

BRIEF DESCRIPTION OF THE DRAWINGS

Preferred embodiments of the present invention will be described in detail with reference to the following drawings, wherein.

DESCRIPTION OF THE PREFERRED EMBODIMENTS

A description will now be given, with reference to the accompanying drawings, a shutter apparatus in accordance with an embodiment of the present invention.

Figure 1:
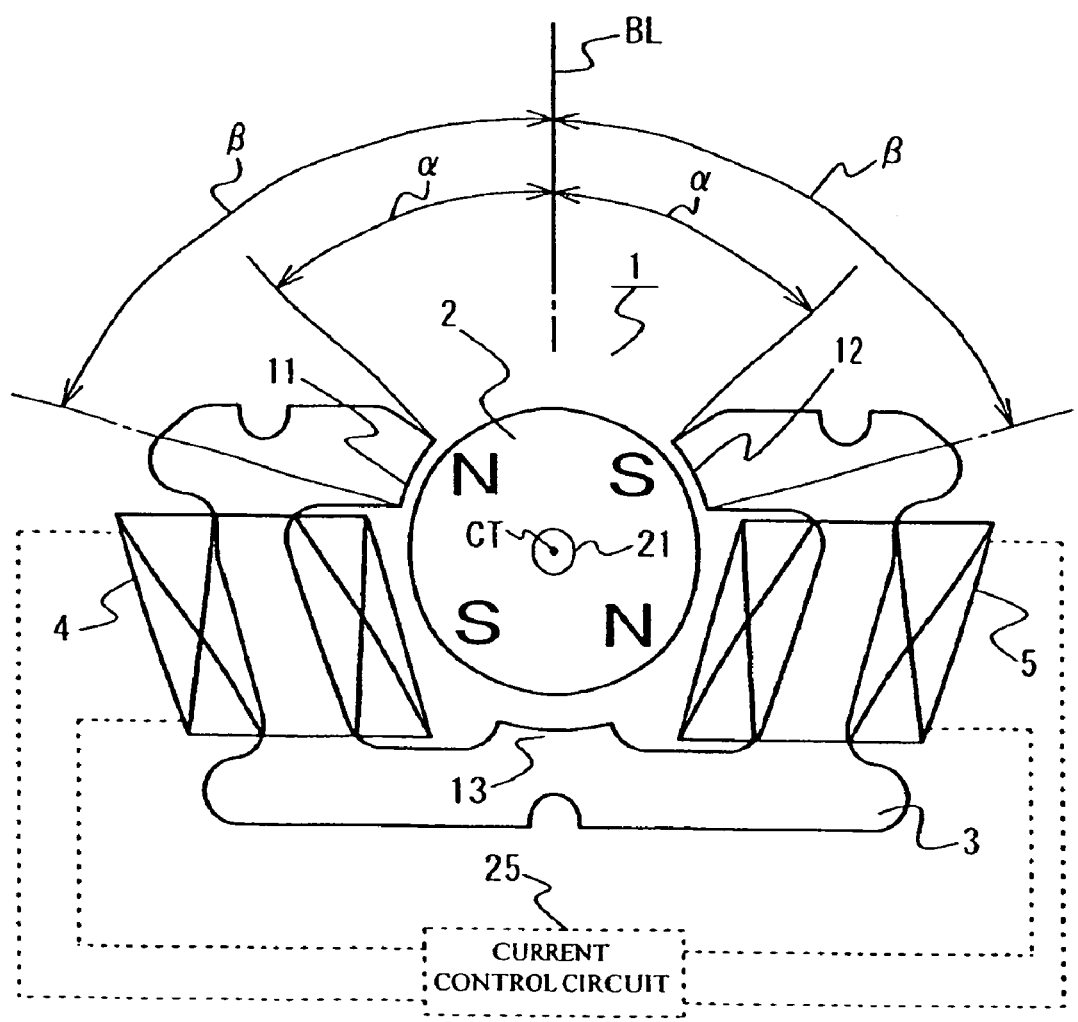
FIG. 1 is a view showing main components of an electromagnetic actuator in accordance with an embodiment of the present invention.

FIG. 1 is a view showing main components of an electromagnetic actuator 1 in accordance with an embodiment of the present invention. The electromagnetic actuator 1 includes a rotor 2 and a stator 3. The rotor 2 is arranged rotatably in both directions in the center of the electromagnetic actuator 1. The stator 3 is arranged to face the outer surface of the rotor 2. The rotor 2 has a cylindrical shape, and has a circular shape at cross section. The stator 3 has a C-shaped planar shape, and is integrally formed. The stator 3 is formed substantially symmetrically with respect to a base line BL of geometric centerline (which runs across the center of the rotor 2, and is referred to as virtual base line). A rotation axis 21 of the rotor 2 is provided in a space surrounded by the C-shaped stator 3, and the rotor 2 is housed inside of the space.

Here, C-shaped denotes not only the shape that looks like a character of C but also a closed shape such as a circle, ellipse, or polygon, having one portion split and opened. Here, the electromagnetic actuator 1 is shown in FIG. 1 in such a manner that an opened side of the stator 3, namely, ends 11 and 12 are arranged on the upper side thereof.

The rotor 2 has four magnetic poles that include two North magnetic poles and two South magnetic poles. The rotor 2 is a permanent magnet which is magnetized in such a manner that identical polarities are positioned to face each other and are rotatably provided in both directions about the rotation axis 21. The above-mentioned both ends 11 and 12 having a C shape are formed to face the outer surface of the rotor 2. The ends 11 and 12 respectively serve as a first magnetic pole 11 and a second magnetic pole 12. A third magnetic pole 13 is arranged in an intermediate position between the first magnetic pole 11 and the second magnetic pole 12.

Figure 4:
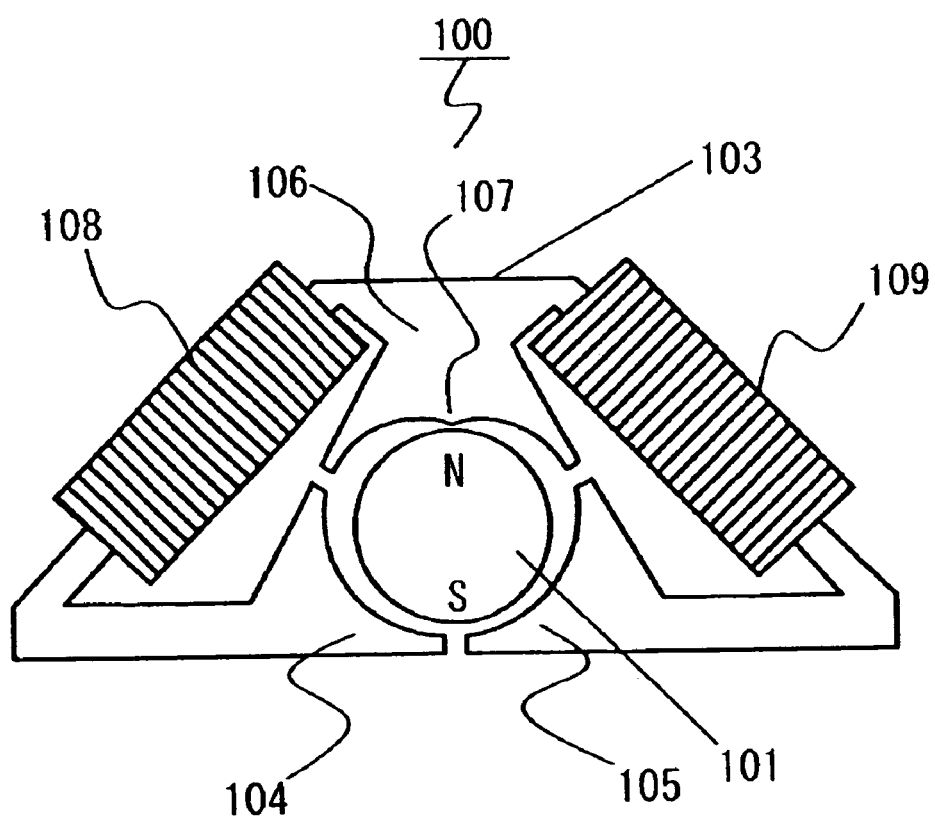
FIG. 4 is a plan view schematically showing the conventional electromagnetic actuator.

The stator 3 in the electromagnetic actuator 1 is so formed to give consideration to the production efficiency. This point is described. If the first magnetic pole 11 and the second magnetic pole 12 are provided to face the outer circumference with wider areas, it is possible to effectively use the magnetic flux applied from the coil, same as the conventional electromagnetic actuator shown in FIG. 4. However, if the first magnetic pole 11 and the second magnetic pole 12 are wider than a given width, the coil cannot be wound directly around the stator 3, as described above. This results in a problem that the manufacturing efficiency drastically degrades. Thus, in the electromagnetic actuator 1, the shape of the stator 3 is specified to give consideration to the manufacturing efficiency, whereas the capabilities desired for the electromagnetic actuator are maintained.

In the fabrication of the electromagnetic actuator 1, the coils 4 and 5 are wound around the stator 3 on the left and on the right. In other words, the first coil 4 is wound between the first magnetic pole 11 and the third magnetic pole 13, and the second coil 5 is wound between the second magnetic pole 12 and the third magnetic pole 13. The stator 3 in the electromagnetic actuator 1 is configured in such a manner that the first magnetic pole 11 and the second magnetic pole 12, which also serve as the ends, are not obstacles in the manufacturing process.

Referring to FIG. 1, the shape of the stator 3 is described in detail. The magnetic poles (the both ends) 11 and 12 are formed within a given angle in both sides with a center CT of the rotation axis 21 serving as a center. Here, the aforementioned given angle, for example, ranges from 15 to 90 degrees in both directions from the base line BL. The shape is so specified that the magnetic poles 11 and 12 are existent within the afore-described range. This angle range denotes a maximum range where no problem arises and the winding process can be implemented efficiently, while the coils 4 and 5 are being wounded in the manufacturing process.

The stator 3 shown in FIG. 1 has an angle $\alpha$ of 45 degrees and an angle $\beta$ of 75 degrees. The angle $\alpha$ is formed by the base line BL and a closer side of the ends 11 and 12. The angle $\beta$ is formed by the base line BL and a farther side of the ends 11 and 12. In the stator 3, the angle $\alpha$ and the angle $\beta$ are both existent within the range from 15 to 90 degrees with respect to the base line BL. This condition of the range is identical in ends 11 and 12 provided on the left and those on the right. Accordingly, an angle ($\beta-\alpha$) results in a width of the magnetic pole. The width may be configured, as required, according to the magnitude of the magnetic flux to be applied to the rotor 2. The given angle range from the base line BL is rather wide, from 15 to 90 degrees. It is therefore possible to retain the necessary magnetic flux sufficiently.

Figure 2A:
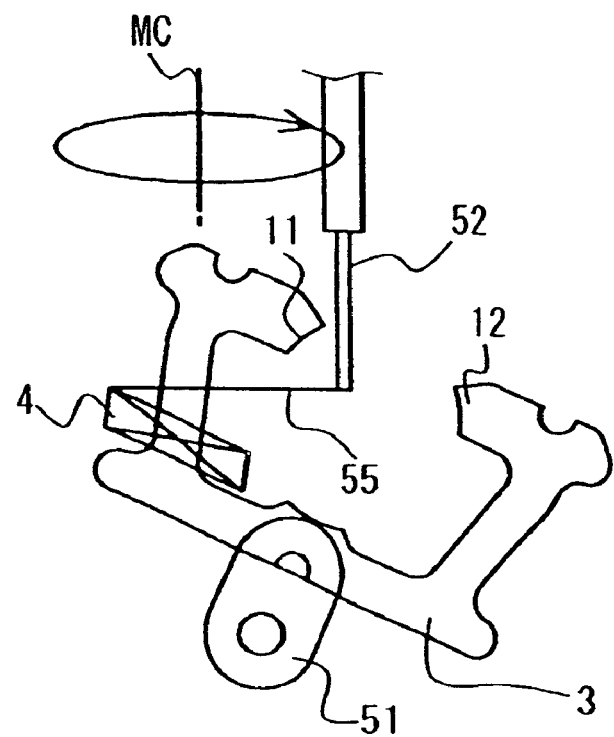
FIG. 2A and FIG. 2B schematically show how coils are wound around a stator.
Figure 2B:
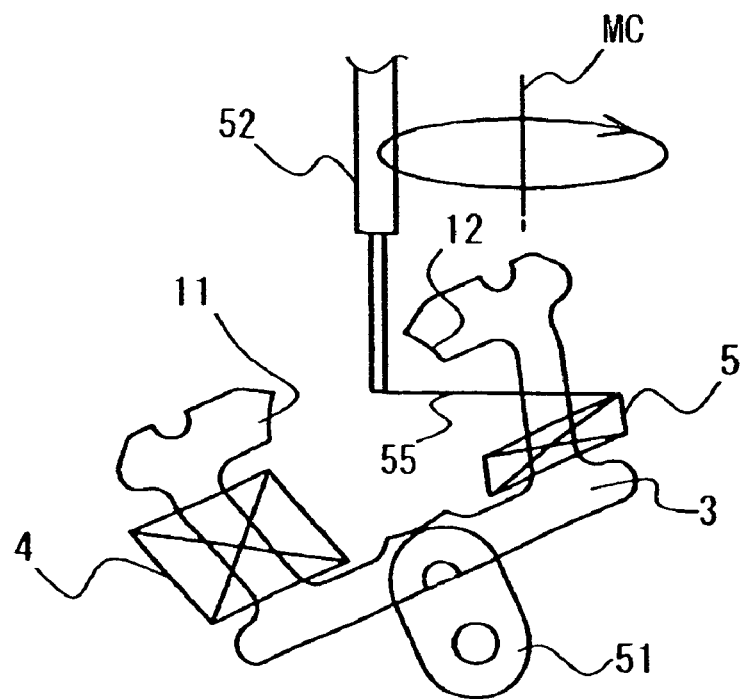

Here, referring to FIG. 2A and FIG. 2B, a description will be given of the situation where the coils 4 and 5 are wound around the stator 3 in the manufacturing process. FIG. 2A and FIG. 2B schematically show how the first coil 4 and second coil 5 are wound. More specifically, FIG. 2A shows where the coil 4 is wound. FIG. 2B shows where the coil 5 is wound. In these figures, a coil-winding apparatus is partially shown. The stator 3 is fixed to a fixed jig 51 of the coil-winding apparatus in a given position. A coil-supplying nozzle 52 rotates about a rotation center MC, while supplying a copper wire 55. With such operations, the first coil 4 is wound around on the left side of the stator 3 at first, as shown in FIG. 2A. Subsequently, the second coil 5 is wound around on the right side of the stator 3, as shown in FIG. 2B.

As is seen in the figures, it is necessary not to cause the magnetic poles 11 and 12 of the rotor 2 to interfere with the copper wire 55, while the copper wire 55 used for the coils is being wounded. If the widths of the magnetic poles 11 and 12 are too great, it is impossible to wind the coils around the stator 3 with the use of the coil-winding apparatus, not shown. This is the reason why the stator 3 has the above-described shape in the electromagnetic actuator 1, giving consideration to this point. With the stator 3 included in the electromagnetic actuator 1, it is possible to wind the coils with the use of the coil-winding apparatus at a high speed, enabling the efficient fabrication.

Again, referring to FIG. 1, other components included in the electromagnetic actuator 1 are described. The first magnetic pole 11 is magnetically excited when the first coil 4 is active. The magnetic second pole 12 is magnetically excited when the second coil 5 is active. On the other hand, the third magnetic pole 13 is magnetically excited by both the first coil 4 and the second coil 5. Hence, the magnetic excitation appears as a combination of the conductive state in the first coil 4 and that in the second coil 5.

In addition, a current control circuit 25, which is connected to the first coil 4 and second coil 5 in the electromagnetic actuator 1, is indicated by a dotted line. In accordance with the present embodiment of the present invention, current is supplied to magnetically excite the first coil 4 and the second coil 5 from the current control circuit 25. There are two patterns in the current supply. In the first pattern, current is supplied from the current control circuit 25 to magnetically excite both the first coil 4 and second coil 5, and the drive state of the rotor 2 is controlled by changing a current supply direction for each coil. In the first pattern, there are two states where the first magnetic pole 11 and the second magnetic pole 12 are magnetically excited to an identical polarity and different polarities. If the first magnetic pole 11 and the second magnetic pole 12 are excited to the identical polarity, the polarity that results in the third magnetic pole 13 becomes stronger than these polarities. In contrast, if the first magnetic pole 11 and the second magnetic pole 12 are excited to different polarities, the magnetization is cancelled in the third magnetic pole 13, resulting in no magnetization state.

In the second pattern, current is supplied from the current control circuit 25 to magnetically excite any one of the first coil 4 and the second coil 5 and the drive state of the rotor 2 is controlled by changing the current supply direction thereof. In the second pattern, only either of the first magnetic pole 11 or the second magnetic pole 12 is magnetically excited and the polarity can be changed to the opposite one by changing the current supply direction thereof. In the second pattern, the third magnetic pole 13 is excited to the opposite polarity from that of either the first magnetic pole or the second magnetic pole, which has been magnetically excited.

In the first pattern, the drive of the rotor 2 is controlled in a two-phase excitation state where the first coil 4 and the second coil 5 are magnetically excited. Meanwhile, in the second pattern, the drive of the rotor 2 is controlled in a one-phase excitation state where either the first coil 4 or the second coil 5 is magnetically excited.

Figure 3:
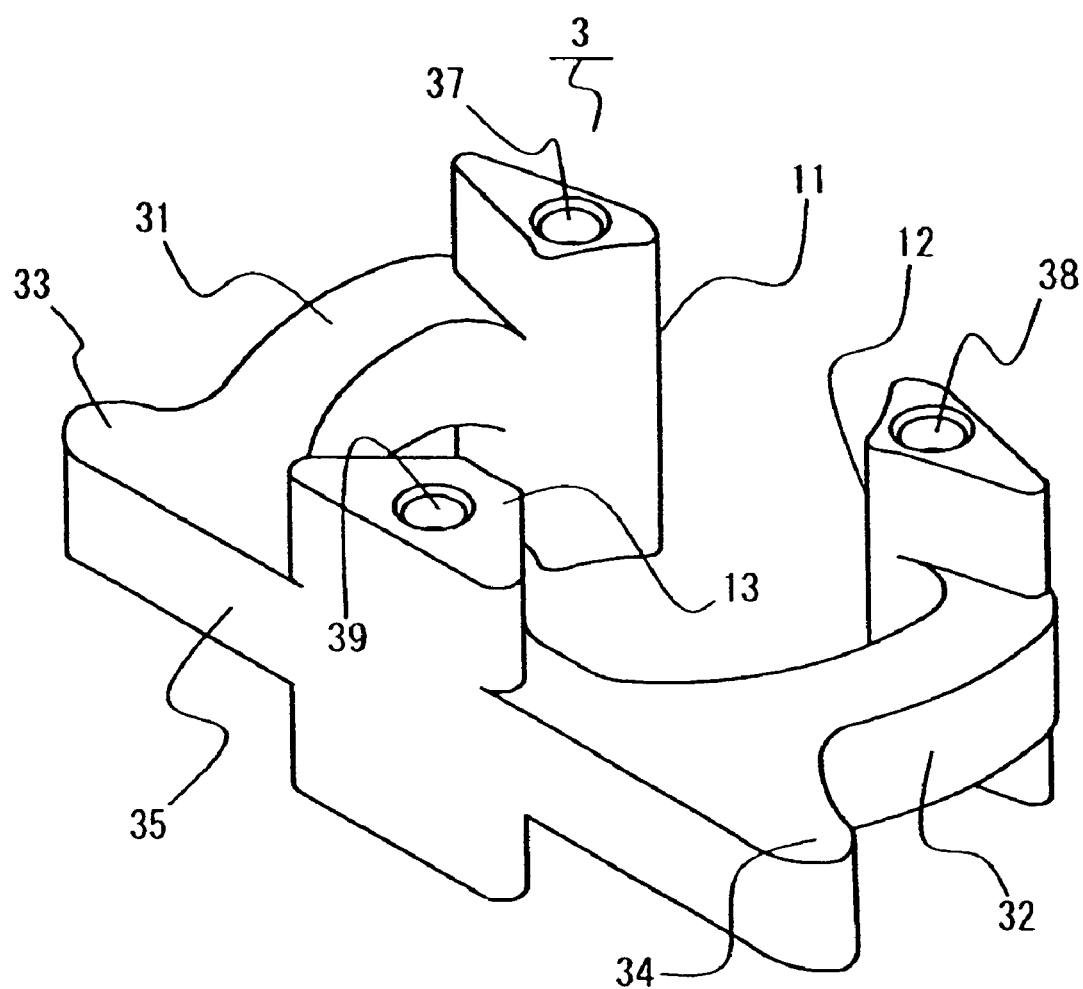
FIG. 3 is a perspective view of the stator having a more preferable shape.

FIG. 3 is a perspective view of the stator 3 having a more preferable shape. In FIG. 3, the same components and configurations as those in FIG. 1 have the same reference numerals. The first magnetic pole 11 and the second magnetic pole 12 in the stator 3 are formed to face the circumferential surface of the rotor 2, not shown, and are formed to be oblong to correspond to the length of a longer side of the rotor 2. The stator 3 includes arm portions 31 and 32 on both sides thereof, and the arm portions 31 and 32 are connected to a base portion 35. The third magnetic pole 13 is arranged in the center of the base portion 35. The third magnetic pole 13 is also formed to be oblong same as the first magnetic pole 11 and the second magnetic pole 12.

In the stator 3, the coils 4 and 5 are wound around the arm portions 31 and 32 in order to magnetically excite the first through third magnetic poles. Shoulder portions 33 and 34 are provided on rear ends of the respective arm portions so that the coils 4 and 5 are positioned to prevent the misalignment or disintegration of the coils 4 and 5. Such provided shoulder portions 33 and 34 realize the structure where the coils 4 and 5 wound around the arm portions 31 and 32 are surely positioned and retained in given positions. Depressed portions 37 through 39 are formed on tops of the magnetic poles 11 through 13. The electromagnetic actuator 1 in accordance with the present embodiment is incorporated into a module with cases set from top and bottom. The depressed portions 37 through 39 are used for setting and positioning the cases.

As described heretofore, the magnetic poles are provided on the ends in the electromagnetic actuator 1 in such a manner that the positions thereof do not cause a problem in the manufacturing process, thereby enabling the efficient manufacturing process. Also, the range where the magnetic poles are formed can be configured wide enough to maintain the capabilities of the electromagnetic actuator.

Although a preferred embodiment has been described heretofore, the present invention is not limited to the above-mentioned embodiment, and other embodiments, variations and modifications may be made without departing from the scope of the present invention. The present invention is applicable to any stator around which the coil is wound. The structure where the rotor 2 having four magnetic poles has been exemplarily described, yet other structures are applicable.

What is claimed is:

1. An electromagnetic actuator comprising:
   a rotor; and
   a stator around which coils are directly wound, central axes of the coils pointing generally parallel to a tangent of an outer surface of the rotor,
   wherein:
   the stator is C-shaped and composed of one part;
   the rotor is arranged so that a rotation axis thereof is existent in a space surrounded by the stator;
   both ends of the stator having a surface respectively formed as a first magnetic pole and a second magnetic pole, each surface of a width defined within a range from 15 to 90 degrees from a virtual base line with respect to the rotation axis serving as a center, wherein the virtual base line is set to run a center of the rotation axis and separate the stator into left and right; and
   the stator is formed symmetrically with respect to the virtual base line.

2. The electromagnetic actuator as claimed in claim 1, wherein the stator includes shoulder portions that suppress misalignment or disintegration of the coils.

3. The electromagnetic actuator as claimed in claim 1, wherein the stator further includes a third magnetic pole arranged in an intermediate position between the first magnetic pole and the second magnetic pole.

4. The electromagnetic actuator as claimed in claim 1, wherein the surface of the ends are each formed to face the outer surface of the rotor over substantially all of their width.

5. The electromagnetic actuator as claimed in claim 1, wherein the surface of the ends are each formed to face an outer circumference of the rotor over substantially all of their width.

6. An electromagnetic actuator comprising:
   a rotor;
   a stator; and
   a plurality of coils directly wound around the stator, the coils having central axes pointing generally parallel to a tangent of an outer surface of the rotor;
   wherein:
   the stator is C-shaped and composed of one part;
   the rotor is arranged so that a rotation axis thereof is existent in a space surrounded by the stator;
   both ends of the stator having a surface respectively formed as a first magnetic pole and a second magnetic pole, each surface of a width defined within a range from 15 to 90degrees from a virtual base line with respect to the rotation axis serving as a center, wherein the virtual base line is set to run a center of the rotation axis and separate the stator into left and right
   the stator is formed symmetrically with respect to the virtual base line.

7. The electromagnetic actuator as claimed in claim 6, wherein the surface of the ends are each formed to face the outer circumference of the rotor over substantially all of their width.

8. An electromagnetic actuator comprising:
   a rotor having an axis of rotation;
   a stator; and
   a plurality of coils directly wound around the stator;

wherein:

the stator is C-shaped, composed of one part and formed defining a first end, a second end and an intermediate position disposed between the first end and the second end, wherein the stator further includes a first arm portion between the first end and the intermediate position and a second arm portion between the second end and the intermediate position, the first and second arm portions each having a center line pointing generally parallel to a tangent of an outer surface of the rotor;

the rotor is arranged so that the rotation axis thereof is existent in a space suffounded by the stator; a first one of the plurality of coils is wound about the first arm portion, the first coil having a central axis coaxial with the center line of the first arm portion, and a second one of the plurality of coils is wound about the second arm portion, the second coil having a central axis coaxial with the center line of the second arm portion;

wherein the first end of the stator includes a surface formed as a first magnetic pole, and the second end of the stator includes a surface formed as a second magnetic pole, and wherein the first magnetic pole and the second magnetic pole each are of a width defined within a range from 15 to 90 degrees from a virtual base line with respect to the rotation axis serving as a center, and wherein the virtual base line is set to run a center of the rotation axis and separate the stator into left and right; and the stator is formed symmetrically with respect to the virtual base line.

9. The electromagnetic actuator as claimed in claim 8, wherein the surfaces of the first and second ends are each formed to face the outer circumference of the rotor over substantially all of their width.

10. The electromagnetic actuator as claimed in claim 8, wherein the intermediate position includes a surface formed as a third magnetic pole.

11. The electromagnetic actuator as claimed in claim 8, wherein the widths of the first and second magnetic poles permit an efficient winding of the first and the second coils about the respective arm portions of the stator.

* * * * *